(12) United States Patent
Watanabe et al.

(10) Patent No.: US 9,968,232 B2
(45) Date of Patent: May 15, 2018

(54) AUTONOMOUS TRAVELING BODY

(71) Applicant: TOSHIBA LIFESTYLE PRODUCTS & SERVICES CORPORATION, Kawasaki-shi (JP)

(72) Inventors: Kota Watanabe, Seto (JP); Hirokazu Izawa, Aisai (JP); Kazuhiro Furuta, Seto (JP); Yuuki Marutani, Nagakute (JP)

(73) Assignee: TOSHIBA LIFESTYLE PRODUCTS & SERVICES CORPORATION, Kawasaki-shi (JP)

( * ) Notice: Subject to any disclaimer, the term of this patent is extended or adjusted under 35 U.S.C. 154(b) by 0 days. days.

(21) Appl. No.: 15/305,055

(22) PCT Filed: Apr. 16, 2015

(86) PCT No.: PCT/JP2015/061761
§ 371 (c)(1),
(2) Date: Oct. 18, 2016

(87) PCT Pub. No.: WO2015/159961
PCT Pub. Date: Oct. 22, 2015

(65) Prior Publication Data
US 2017/0215672 A1    Aug. 3, 2017

(30) Foreign Application Priority Data
Apr. 18, 2014 (JP) .................. 2014-086811

(51) Int. Cl.
*A47L 9/28* (2006.01)
*G05D 1/02* (2006.01)
(Continued)

(52) U.S. Cl.
CPC ............. *A47L 9/2852* (2013.01); *A47L 9/009* (2013.01); *A47L 9/0411* (2013.01);
(Continued)

(58) Field of Classification Search
CPC ........... A47L 2201/022; A47L 2201/04; A47L 9/009; A47L 9/0411; A47L 9/2826;
(Continued)

(56) References Cited

U.S. PATENT DOCUMENTS 7,213,985 B1 *  5/2007  Chen ........................ B41J 3/407
                                                    400/29
9,192,869 B2 * 11/2015  Moriya .................. A63H 17/00
(Continued)

FOREIGN PATENT DOCUMENTS

JP    2004-133846 A    4/2004
JP    2005-205529 A    8/2005
(Continued)

OTHER PUBLICATIONS

International Search Report dated Jul. 14, 2015 in PCT/JP2015/061761 filed Apr. 16, 2015.

*Primary Examiner* — Tyler J Lee
(74) *Attorney, Agent, or Firm* — Oblon, McClelland, Maier & Neustadt, L.L.P.

(57) ABSTRACT

A vacuum cleaner main body includes a main body case, a camera provided in the main body case and that can perform imaging at a given angle of view, a driving wheel that allows the main body case to travel, and a controller. The controller includes at least a traveling mode and an imaging mode. In the traveling mode, the controller controls the drive of the driving wheel to allow the main body case to travel autonomously. In the imaging mode, the controller controls the main body case to autonomously travel to a given imaging position so that the camera sequentially images still images in a plurality of adjacent directions at an angle equal to or smaller than the angle of view. The vacuum cleaner main body can securely image, with the camera, a wide range without any blind spots.

8 Claims, 12 Drawing Sheets

(51) Int. Cl.
  *G05D 1/00* (2006.01)
  *A47L 9/00* (2006.01)
  *A47L 9/04* (2006.01)
(52) U.S. Cl.
  CPC .......... *A47L 9/2826* (2013.01); *A47L 9/2857* (2013.01); *A47L 9/2873* (2013.01); *A47L 9/2894* (2013.01); *G05D 1/0011* (2013.01); *G05D 1/0022* (2013.01); *G05D 1/0238* (2013.01); *A47L 2201/022* (2013.01); *A47L 2201/04* (2013.01)
(58) Field of Classification Search
  CPC .... A47L 9/2852; A47L 9/2857; A47L 9/2873; A47L 9/2894; C01G 3/00; C09D 5/10; C09D 5/14; C09D 5/16; C09D 7/1216; G05D 1/0011; G05D 1/0022; G05D 1/0238
  USPC ...................................................... 701/2, 23
  See application file for complete search history.

(56) References Cited

U.S. PATENT DOCUMENTS

| | | | |
|---|---|---|---|
| 9,604,359 B1* | 3/2017 | Grotmol | B25J 9/163 |
| 2004/0066449 A1* | 4/2004 | Givon | G03B 35/00 348/48 |
| 2004/0167669 A1* | 8/2004 | Karlsson | G01C 21/12 700/259 |
| 2004/0167716 A1* | 8/2004 | Goncalves | G01C 21/12 340/995.1 |
| 2005/0192707 A1* | 9/2005 | Park | A47L 9/281 700/259 |
| 2006/0184274 A1* | 8/2006 | Sakai | G05D 1/0246 700/245 |
| 2007/0276541 A1* | 11/2007 | Sawasaki | G05D 1/0246 700/253 |
| 2008/0086236 A1 | 4/2008 | Saito et al. | |
| 2009/0143913 A1* | 6/2009 | Kim | B25J 9/1674 700/259 |
| 2009/0326713 A1* | 12/2009 | Moriya | A63H 17/00 700/255 |
| 2010/0222925 A1* | 9/2010 | Anezaki | G05D 1/0221 700/253 |
| 2012/0035797 A1* | 2/2012 | Oobayashi | G05D 1/0214 701/23 |
| 2012/0103367 A1* | 5/2012 | Tang | G05D 1/0246 134/18 |
| 2013/0093852 A1* | 4/2013 | Ye | A61H 3/061 348/46 |
| 2013/0242137 A1* | 9/2013 | Kirkland | G03B 37/02 348/231.99 |
| 2014/0036062 A1* | 2/2014 | Yoon | G01V 8/10 348/118 |
| 2014/0152774 A1* | 6/2014 | Wakabayashi | G08G 1/168 348/46 |
| 2014/0267772 A1* | 9/2014 | Morin | H04N 5/232 348/169 |
| 2014/0350839 A1* | 11/2014 | Pack | G01C 21/30 701/409 |
| 2016/0055646 A1* | 2/2016 | Wirbel | G06T 7/74 382/107 |
| 2016/0133019 A1* | 5/2016 | Wagner | G03B 17/38 348/144 |
| 2016/0375862 A1* | 12/2016 | Ito | B60R 25/1004 348/148 |
| 2017/0024877 A1* | 1/2017 | Versace | G06K 9/00664 |
| 2017/0193298 A1* | 7/2017 | Versace | G06K 9/00664 |

FOREIGN PATENT DOCUMENTS

| | | |
|---|---|---|
| JP | 2006-139525 A | 6/2006 |
| JP | 2006-201991 A | 8/2006 |
| JP | 2008-090575 A | 4/2008 |
| JP | 2011-233149 A | 11/2011 |
| JP | 2013-235351 A | 11/2013 |
| WO | WO 2010/114235 A1 | 10/2010 |

\* cited by examiner

AUTONOMOUS TRAVELING BODY

CROSS REFERENCE TO RELATED APPLICATIONS

The present application is a National Stage Application of PCT/JP2015/061761 filed on Apr. 16, 2015. The PCT application claims priority to Japanese Patent Application No. 2014-86811 filed on Apr. 18, 2014. All of the above applications are herein incorporated by reference in their entirety.

TECHNICAL FIELD

Embodiments described herein relate generally to an autonomous traveling body that includes an imaging unit capable of imaging a subject.

BACKGROUND

Conventionally, there is known an autonomous traveling type vacuum cleaner (cleaning robot) that autonomously travels on a floor surface to be cleaned and cleans the floor surface while detecting an obstacle and the like using a sensor, for example.

Recently, in order to monitor and check the state of a house (whether a window is left open, whether a light is left on, etc.) or the state of a pet when a user is outside, there has been used a system employing such a vacuum cleaner in which the vacuum cleaner can automatically image the state of a room with a camera in response to an order from a mobile terminal.

In such a system, it is preferable to image a range as wide as possible without any blind spots or hindrance of an obstacle and the like, from a viewpoint of monitoring and checking the room.

CITATION LIST

Patent Literature

PTL 1: Japanese Laid-open Patent Publication No. 2011-233149
PTL 2: Japanese Laid-open Patent Publication No. 2013-235351

Technical Problem

The present invention aims at providing an autonomous traveling body capable of securely imaging a wide range without any blind spots using an imaging unit.

Solution to Problem

The autonomous traveling body of the embodiment includes a main body case, an imaging unit that is provided in the main body case and that can image an object at a given angle of view, a driving wheel that allows the main body case to travel, and a control unit. The control unit has at least a traveling mode and an imaging mode. In the traveling mode, the control unit controls the drive of the driving wheel so that the main body case travels autonomously. In the imaging mode, the control unit controls the main body case to travel autonomously to given imaging positions so that the imaging unit sequentially images still images in a plurality of adjacent directions at an angle smaller than an angle of view.

DETAILED DESCRIPTION

Figure 1A:
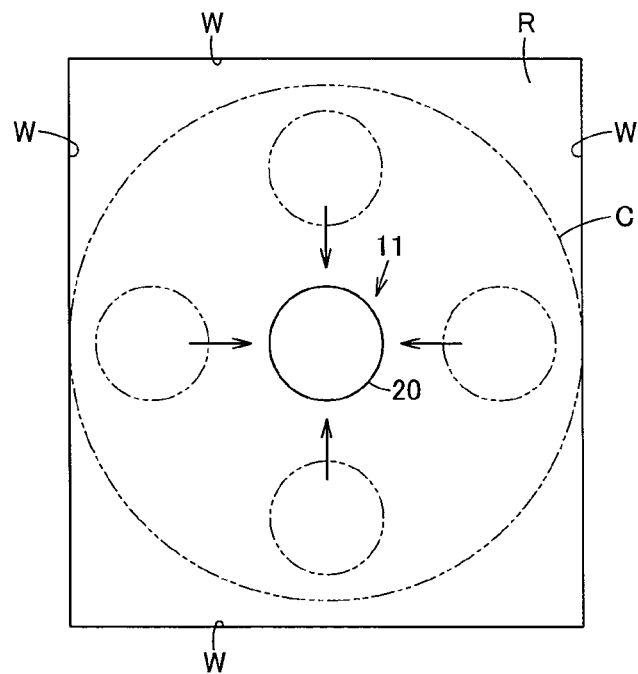
FIG. 1A is a plan view schematically illustrating how to move to an imaging position of an autonomous traveling body according to a first embodiment.

In the following, the configuration of the first embodiment will be described with reference to FIGS. 1A and 1B to FIG. 5.

In FIGS. 1A and 1B to FIG. 4, the numerical symbol 10 represents a vacuum cleaner as a traveling body apparatus. The vacuum cleaner 10 includes a vacuum cleaner main body 11 as an autonomous traveling body, and a charging device (charging base) 12 that is a base for charging the vacuum cleaner main body 11. Then, the vacuum cleaner main body 11 performs communication (transmission and reception) with an access point 14 as relaying means (relaying unit) such as a home gateway (router) disposed in a room R to be cleaned, for example, using wireless communication such as Wi-Fi (registered trademark) or Bluetooth (registered trademark). In this way, the vacuum cleaner main body 11 can perform wireless communication with an external device 16 such as a cellular phone through a (external) network 15 such as the Internet.

The vacuum cleaner main body 11, in the first embodiment, is a so-called autonomous traveling type robot cleaner that cleans a floor surface to be cleaned while autonomously traveling on the floor surface. The vacuum cleaner main body 11 includes, as traveling and cleaning units, a hollow main body case 20, an electric blower 21 as an operation unit (cleaning unit) stored in the main body case 20, a dust collection unit 22 communicated with a suction side of the electric blower 21, driving wheels 23, 23 as a plurality (pair) of drive units for traveling, for example, motors 24, 24 that are drive means (drive units) as operation units for driving the driving wheels 23, 23, a turning wheel 25 for turning, side brushes 26, 26 that are complementary cleaning means (complementary cleaning units) as a plurality (pair) of turning cleaning units (cleaning units), for example, that are disposed so as to be turnable along a floor surface on the bottom side of the main body case 20, side brush motors 27, 27 that are turning drive means (turning drive units) as operation units (cleaning units) for turning the side brushes 26, 26, a rotary brush 28 that is a cleaning means as a rotary cleaning body (cleaning unit) disposed to be rotatable on the bottom side of the main body case 20, and a brush motor 29 that is a rotary drive means (rotary drive unit) as an operation unit (cleaning unit) for driving the rotary brush 28 to rotate, for example. Moreover, the vacuum cleaner main body 11 includes, as input/output and control units, a sensor unit 31 as an operation unit including various sensors, a display unit 34 as display means, a camera 35 as imaging means (imaging unit), a wireless local area network (LAN) device 36 as wireless communication means (wireless communication unit), and a control unit (control means) 37 constituted by a circuit board and the like, for example. Then, the vacuum cleaner main body 11 includes, in the main body case 20 thereof, a secondary battery 39 for supplying electricity to the above-described units. Note that, in the following explanation, the direction along the traveling direction of the vacuum cleaner main body 11 (main body case 20) is referred to as a front-rear direction (FR, RR directions illustrated by arrows in FIG. 3, etc.), and the right-left direction (both side direction) crossing (orthogonal to) the front-rear direction is referred to as a width direction.

The main body case 20 is formed of synthetic resin and the like to have a flat columnar shape (disk shape), for example. The main body case 20 has a suction port 41 longitudinal in the width direction, that is, the wide suction port 41, open at a rear position in the center portion in the width direction of the circular bottom surface, and a plurality of exhaust ports 42 open on the front side of the suction port 41. Moreover, the main body case 20 is provided with the camera 35.

The suction port 41 is communicated with the suction side of the electric blower 21 through the dust collection part 22. At the suction port 41, the rotary brush 28 is disposed to be rotatable.

Each of the exhaust ports 42 is communicated with the exhaust side of the electric blower 21 through the dust collection unit 22.

The electric blower 21 generates negative pressure when driven and sucks dust from the suction port 41 to the dust collection unit 22, and is stored in the main body case 20 such that the suction side directs backward and the axis direction corresponds to the front-rear direction (horizontal direction), for example. Note that the electric blower 21 may be unnecessary in the configuration where dust is raked to the dust collection unit 22 by the rotary brush 28, for example, and is not an essential component.

The dust collection unit 22 collects dust sucked from the suction port 41 when the electric blower 21 is driven.

Each driving wheel 23 allows the vacuum cleaner main body 11 (main body case 20) to travel (travel autonomously) in the forward direction and the backward direction on a floor surface, that is, the driving wheel 23 is used for traveling. The driving wheels 23 are disposed symmetrically in the width direction with a rotary shaft (not illustrated) extending along the right-left width direction.

Each motor 24 is disposed to correspond to each of the driving wheels 23, for example, and can drive each driving wheel 23 independently.

The turning wheel 25 is disposed at a position that is substantially center in the width direction and on the front side in the main body case 20, and is a driven wheel turnable along a floor surface.

Each side brush 26 has a plurality of (e.g., three) brush bristles 43 as cleaning bodies that project radially to be in contact with a floor surface. The side brushes 26, 26 are disposed at positions that are on the front side of the driving wheels 23, 23 and on both sides of the rear portion of the turning wheel 25 in the main body case 20.

Each side brush motor 27 can rotate each side brush 26 toward the center side in the width direction of the main body case 20, in other words, the right side brush 26 toward the left side and the left side brush 26 toward the right side, so that each side brush 26 rakes dust in the front side (forward direction) to the side of the suction port 41.

Note that such side brushes 26 and the side brush motors 27 are not essential components as long as the cleaning is performed sufficiently by the electric blower 21 or the rotary brush 28.

The rotary brush 28 has a long shape, and both ends thereof are supported to be rotatable by both side portions in the width direction of the suction port 41. Then, the rotary brush 28 projects from the suction port 41 to the lower side of the bottom surface of the main body case 20, so that when the vacuum cleaner main body 11 is placed on a floor surface, the lower portion of the rotary brush 28 is brought into contact with the floor surface to rake dust.

The brush motor 29 is stored in the main body case 20 and is connected to the rotary brush 28 through a gear mechanism (not illustrated) as a mechanism unit.

Note that the rotary brush 28 and the brush motor 29 are not essential components as long as the cleaning is performed sufficiently by the electric blower 21 or the side brushes 26, 26.

Moreover, the sensor unit 31 has the functions of a rotation speed detection means (rotation speed detection unit) that measures a rotation speed of the motor 24, for example, such as an optical encoder, obstacle detection means (obstacle detection unit) as range finding means (range finding unit) that detects an obstacle such as a wall and furniture by detecting a distance to the obstacle, such as an ultrasonic sensor or an infrared sensor, and step detection means (step detection unit) that detects a step and the like on a floor surface, such as an infrared sensor, for example. The sensor unit 31 is disposed at each of the upper portion, the outer peripheral portion (front side and rear side), and the lower portion of the main body case 20.

The display unit 34 displays time or a period of time or various kinds of information related to the vacuum cleaner main body 11, and is disposed on the upper portion of the main body case 20, for example. Note that the display unit 34 may be configured as a touch panel that also has a function of an input operation means (input operation unit) allowing a user to directly input various settings, for example.

The camera 35 includes a camera module as an imaging means body (imaging unit body) for imaging and a lighting device lit by the control unit 37 in imaging such as a light-emitting diode (LED). The camera 35 is disposed on the outer peripheral portion or the upper portion of the main body case 20 in the center portion in the right-left direction on the front side of the main body case 20, for example. The camera 35 can image, at a given horizontal angle of view (e.g., 105°), still images of an area in the direction inclined upward along the radial direction of the central axis of the main body case 20, that is, the area from the front side to the front upper side in the first embodiment, and can convert the imaged still images into data and output them to the control unit 37. That is, the camera 35 is disposed at a position separate from the turning center (central axis) of the main body case 20.

The wireless LAN device 36 is used for wireless communication with an external device through the access point 14 and the network 15. Thus, it is possible to receive various kinds of information from the network 15 and input various kinds of information from the external device 16 through the wireless LAN device 36. That is, the wireless LAN device 36 has the function of external signal receiving means (external signal receiving unit) that receive external signals transmitted from the external device 16 through the network 15 and the access point 14 and of signal receiving means (signal receiving unit).

The control unit 37 includes a central processing unit (CPU) as a control unit main body, a read-only memory (ROM) as a storage that stores fixed data such as a program read out by the CPU, a random-access memory (RAM) as an area storage that dynamically forms various memory areas such as a work area that is an operation area for data processing by a program, a memory that is memory means (memory unit) for storing image data imaged with the camera 35, for example a synchronous dynamic random-access memory (SDRAM), and a timer that clocks calendar information such as current date and time, for example. The control unit 37 is electrically connected to the electric blower 21, each monitor 24, each side brush motor 27, the brush motor 29, the sensor unit 31, the display unit 34, the camera 35, and the wireless LAN device 36 and the like. The control unit 37 has, based on a detection result of the sensor unit 31, a cleaning mode that is a traveling mode for allowing autonomous traveling and controls the drive of the electric blower 21, each motor 24, each side brush motor 27, a brush motor 29, and the like, a charging mode for charging the secondary battery 39 through the charging device 12, an imaging mode for imaging with the camera 35, and a stand-by mode while waiting operation.

The secondary battery 39 supplies electricity to the electric blower 21, each motor 24, each side brush motor 27, the brush motor 29, the sensor unit 31, the camera 35, the wireless LAN device 36, the control unit 37, and the like. The secondary battery 39 is electrically connected to charging electrodes 45 exposed at both sides of the rear portion of the bottom surface of the main body case 20, for example.

Meanwhile, the charging device 12 is disposed at a position where the cleaning is not hindered, such as the vicinity of a wall W defining the room R. In the charging device 12, a charging circuit 52 for charging the secondary battery 39 such as a constant current circuit is stored in a charging device case 51, and terminals for charging 53, 53 connected electrically with the charging circuit 52, a power cord 54 for power supply connected to a commercial power supply, and the like are exposed outside the charging device case 51. Here, the operation of the charging circuit 52 is controlled by a charging device control unit 58. Then, the charging device control unit 58 has a charging mode for charging the secondary battery 39 through the charging circuit 52 and a stand-by mode while waiting for operation.

Next, the operation of the above-described first embodiment will be described.

In general, the operation of the autonomous traveling type vacuum cleaner main body 11 is roughly categorized to a cleaning operation in which the vacuum cleaner main body 11 performs cleaning and a charging operation in which the secondary battery 39 is charged by the charging device 12. In addition to such operations, the autonomous traveling type vacuum cleaner main body 11 of the first embodiment performs imaging operation in which still images of the state of the room R and the like are imaged.

(Cleaning Operation)

At the start of cleaning such as timing of a preliminarily set cleaning start time, the control unit 37 turned from the stand-by mode to the cleaning mode drives the electric blower 21, the driving wheels 23, 23 (motor 24, 24), the side brushes 26, 26 (side brush motors 27, 27), the rotary brush 28 (brush motor 29), and the like, so that the vacuum cleaner main body 11 separates from the charging device 12, for example, and starts cleaning while autonomously traveling on a floor surface using the driving wheels 23, 23. Note that the cleaning start position can be set to an arbitrary position such as a traveling start position of the vacuum cleaner main body 11 or the entrance of the room R.

During traveling, the control unit 37 monitors the traveling state of the vacuum cleaner main body 11 (main body case 20) by detecting, through the sensor unit 31, a distance to the wall W surrounding the periphery of the room R or an obstacle and the like in the room R, and a step on the floor surface, for example. Then, the control unit 37 drives the driving wheels 23, 23 (motors 24, 24) in accordance with detection by the sensor unit 31, thus controlling the vacuum cleaner main body 11 to travel, on the floor surface, at random or along the wall while avoiding the obstacle, the step, and the like.

Then, the vacuum cleaner main body 11 rakes dust to the suction port 41 using the side brushes 26, 26 driven to turn, and sucks the dust on the floor surface together with air through the suction port 41 on which negative pressure generated by the drive of the electric blower 21 acts through the dust collection unit 22. Moreover, the rotary brush 28 driven to rotate rakes the dust on the floor surface to the dust collection unit 22.

The dust sucked from the suction port 41 together with air is collected separately by the dust collection unit 22, and the air separated from the dust is sucked by the electric blower 21 and, after the electric blower 21 is cooled, is exhausted as exhaust air through the exhaust port 42 to the outside of the main body case 20.

In a given condition where the cleaning of an area to be cleaned has been completed or where the capacity of the secondary battery 39 is reduced to a given amount that is not sufficient to complete cleaning (the voltage of the secondary battery is reduced to almost a discharge finishing voltage), the control unit 37 drives the driving wheels 23, 23 (motors 24, 24) so that the vacuum cleaner main body 11 returns to the charging device 12. Note that in such return, the vacuum cleaner main body 11 may be controlled to approach the charging device 12 based on guide signals output from the charging device 12, or the vacuum cleaner main body 11 may return to a position of the charging device 12 according to a map of the room R preliminarily stored in the control unit 37. Then, the vacuum cleaner main body 11, which has moved (returned) to the charging device 12, stops each unit and finishes cleaning operation after connecting (mechanically and electrically) the charging electrode 45 to the terminals for charging 53.

(Charging Operation)

At a given timing such as a preliminarily set charging start time, after the vacuum cleaner main body 11 has connected to the charging device 12, or at timing at which a given time has passed after the vacuum cleaner main body 11 is connected to the charging device 12, for example, each of the control unit 37 and the charging device control unit 58 is changed to the charging mode to drive the charging circuit 52 and start charging of the secondary battery 39. When it is determined that the voltage of the secondary battery 39 has been increased to a given voltage allowing use, the control unit 37 and the charging device control unit 58 stop charging in the charging circuit 52 and finish the charging operation. Then, each of the control unit 37 and the charging device control unit 58 is changed to the stand-by mode.

(Imaging Operation)

Figure 5:
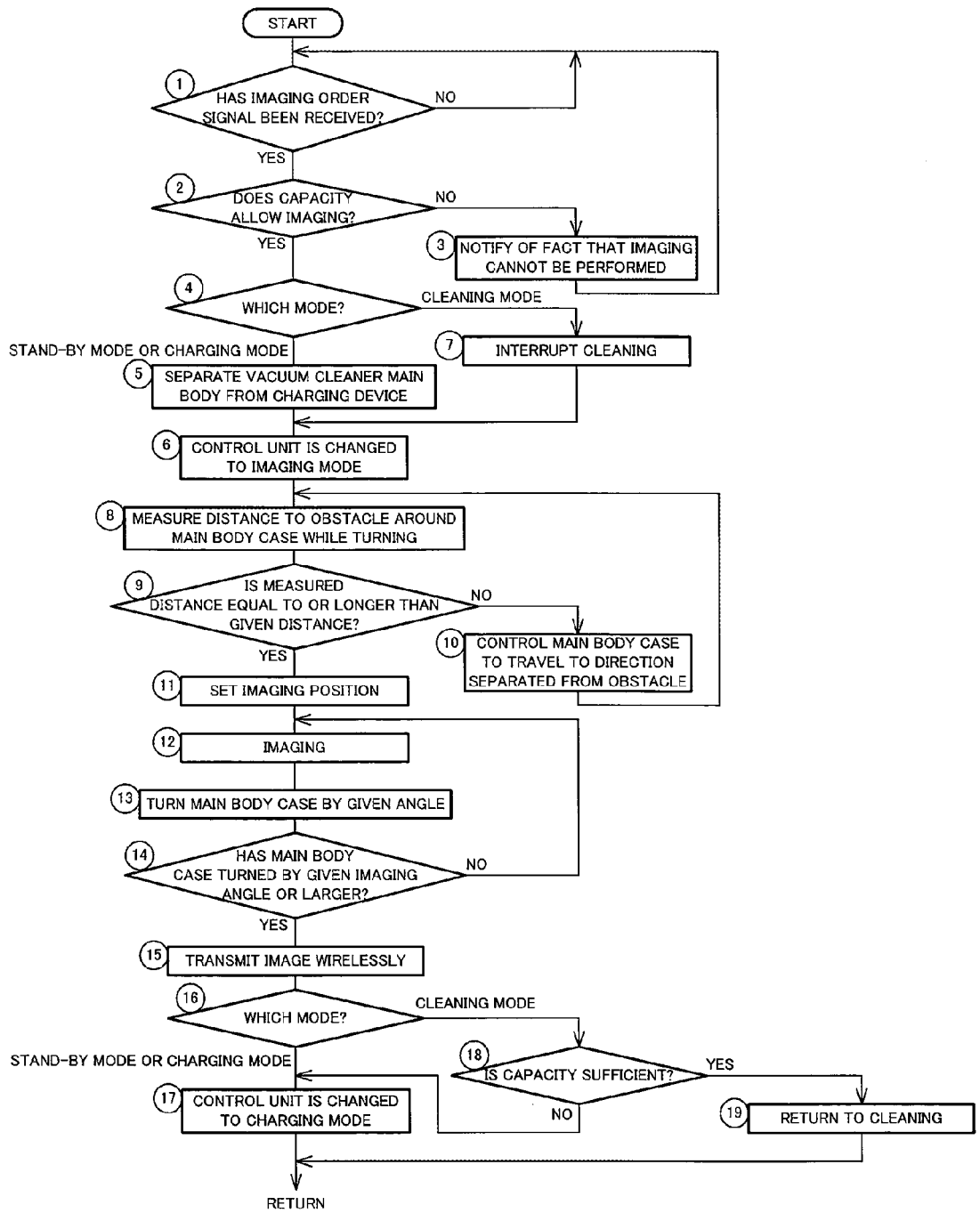
FIG. 5 is a flowchart illustrating control of the autonomous traveling body of the first embodiment in the imaging mode.

With reference to the flowchart of FIG. 5, the control unit 37 determines at real time or each given time, for example, whether the wireless LAN device 36 has received, through the access point 14, imaging order signals that are external signals for ordering imaging with the camera 35 and are transmitted from the external device 16 through the network 15 (Step S1). Note that it is preferable, in wireless communication between the external device 16 and the vacuum cleaner main body 11, that an ID, or a password and the like, are set for each external device 16 and each vacuum cleaner main body 11, for example, to require authentication for connection and prevent reception of illegal signals.

When it is determined, at Step S1, that the wireless LAN device 36 has received image order signals that are external signals for ordering imaging with the camera 35 and are transmitted from the external device 16 through the network 15, the control unit 37 first detects a remaining capacity of the secondary battery 39 regardless of the mode, and determines whether the remaining capacity of the secondary battery 39 is a capacity allowing imaging with the camera 35 (Step S2). Note that, in the following, the capacity allowing imaging is a capacity allowing traveling of the main body case 20 (vacuum cleaner main body 11) by a given distance or longer, imaging with the camera 35, and transmission of the imaged image data from the network 15 to the external device 16 through the wireless LAN device 36.

Then, when it is determined, at Step S2, that the remaining capacity of the secondary battery 39 is not a capacity allowing imaging, the control unit 37 notifies, through the wireless LAN device 36, the external device 16, for example, of the fact that the imaging cannot be performed (Step S3), and returns the processing to Step S1 while ignoring the imaging order signals.

On the other hand, when it is determined, at Step S2, that the remaining capacity of the secondary battery 39 is equal to or larger than the capacity allowing imaging, the control unit 37 (and charging device control unit 58) determines a mode (Step S4).

When the mode is determined to be the charging mode or the stand-by mode at Step S4, the control unit 37 drives the driving wheels 23, 23 (motor 24, 24), separates the vacuum cleaner main body 11 from the charging device 12 (Step S5) before being changed to the imaging mode (Step S6).

On the other hand, when the mode is determined to be the cleaning mode at Step S4, the control unit 37 stops the drive of the electric blower 21, the side brushes 26, 26 (side brush motors 27, 27), and the rotary brush 28 (brush motor 29) to interrupt cleaning (Step S7) before being changed to the imaging mode at Step S6.

Then, in the imaging mode of the vacuum cleaner main body 11 at Step S6, the control unit 37 first drives the driving wheels 23, 23 (motors 24, 24) and measures a distance between the main body case 20 and an obstacle such as the wall W around the main body case 20 by the function of the obstacle detection unit (range finding unit) of the sensor unit 31 while turning the main body case 20 (Step S8), and determines whether the measured distance is equal to or longer than a given distance, e.g., 2 m or longer (Step S9). At Step S8, the main body case 20 turns by 360° in the first embodiment, for example. However, the turning angle may be a given angle smaller than 360° in accordance with a range to be imaged with the camera 35, for example. Note that, in the following, the turn of the main body case 20 (vacuum cleaner main body 11) indicates a so-called ultra-pivotal turn in which one driving wheel 23 (one motor 24) and the other driving wheel 23 (the other motor 24) are rotated in opposite directions to each other, whereby the main body case 20 is turned with the central axis thereof as a turning center while maintaining its position. However, the turn form is not limited thereto, and may be circumferential traveling in which the main body case 20 is turned around a given turning center with a given radius, for example.

Then, when it is determined, at Step S9, that the distance between the main body case 20 and the obstacle around the main body case 20 is not equal to or longer than the given distance (2 m) (the distance is shorter than the given distance (2 m)), for example, the control unit 37 drives the driving wheels 23, 23 (motors 24, 24) so that the main body case 20 travels to a direction separated from the obstacle (wall W, etc.) (Step S10, FIG. 1A), and returns the processing to Step S8. Note that the traveling distance here is set to be equal to or longer than a difference between the given distance used for determination at Step S9 and a distance between the main body case 20 and the obstacle, or set to be the given distance itself, for example, whereby the main body case 20 can be securely separated from the obstacle by the given distance or longer. Moreover, when it is determined, at Step S9, that the distance between the main body case 20 and the obstacle around the main body case 20 is equal to or longer than the given distance (2 m), the position of the main body case 20 (vacuum cleaner main body 11) is set as an imaging position, considering that the main body case 20 (vacuum cleaner main body 11) is positioned in the center of the room R, for example, where no wall W exists within a given distance from the main body case 20 (Step S11).

Figure 1B:
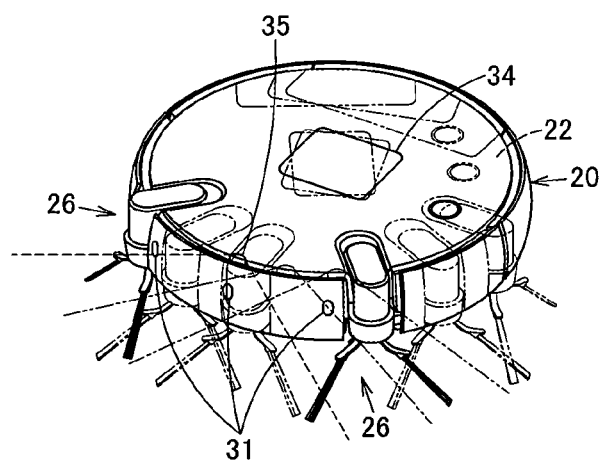
FIG. 1B is a perspective view illustrating action in imaging of the autonomous traveling body.
Figure 2:
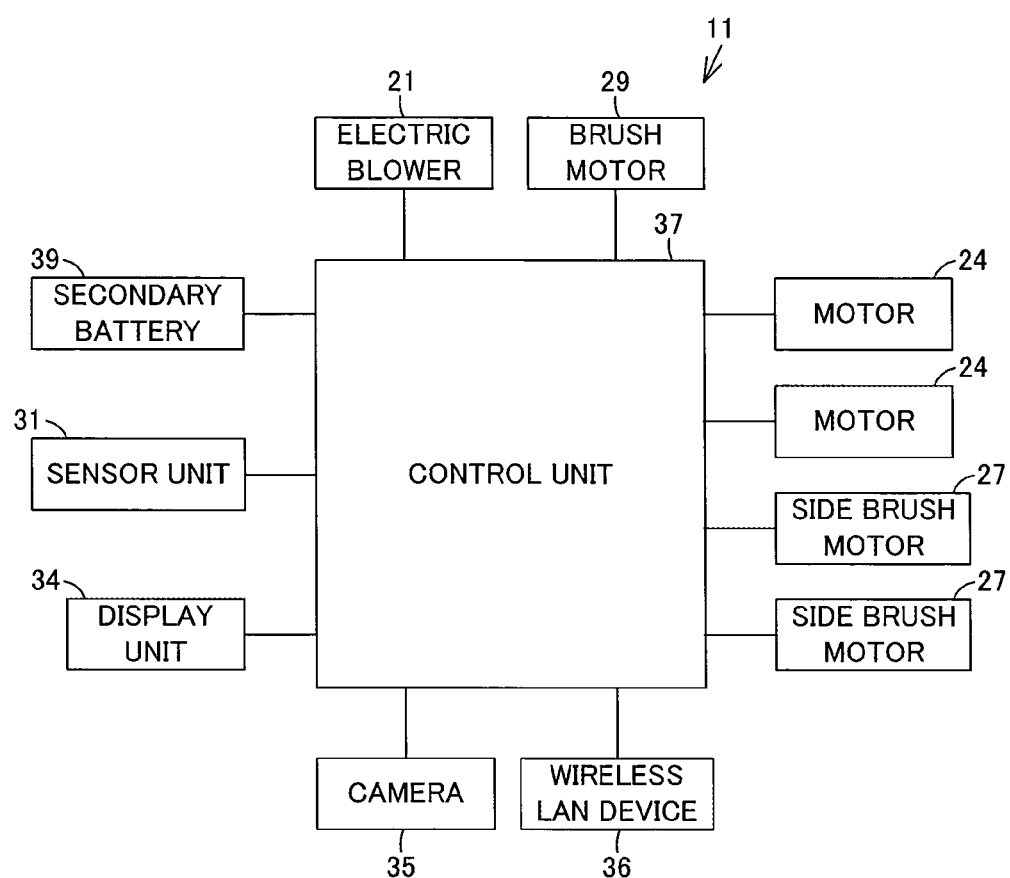
FIG. 2 is a block diagram illustrating an internal configuration of the autonomous traveling body of the first embodiment.
Figure 3:
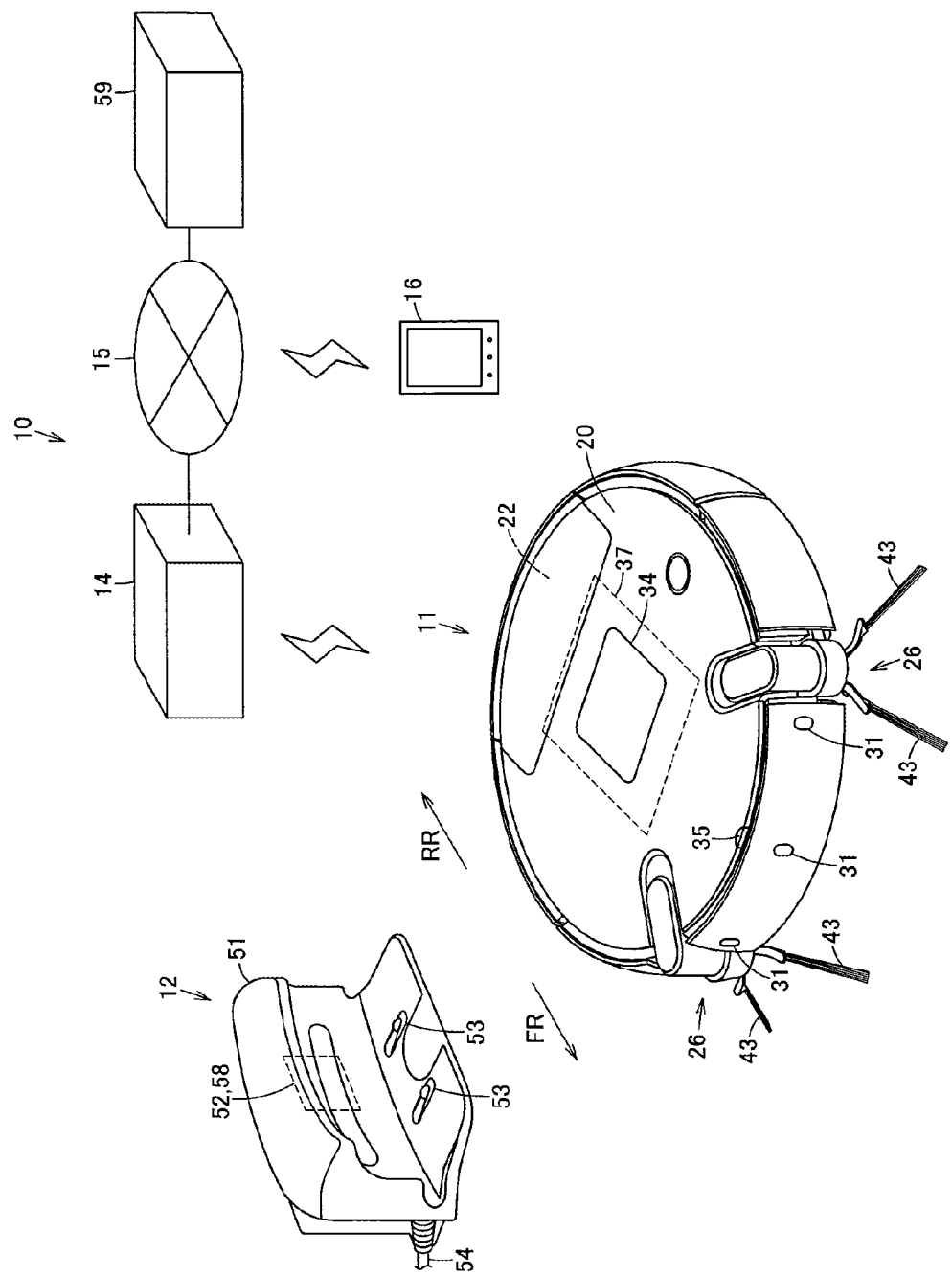
FIG. 3 is an explanatory diagram schematically illustrating a system including the autonomous traveling body of the first embodiment.
Figure 4:
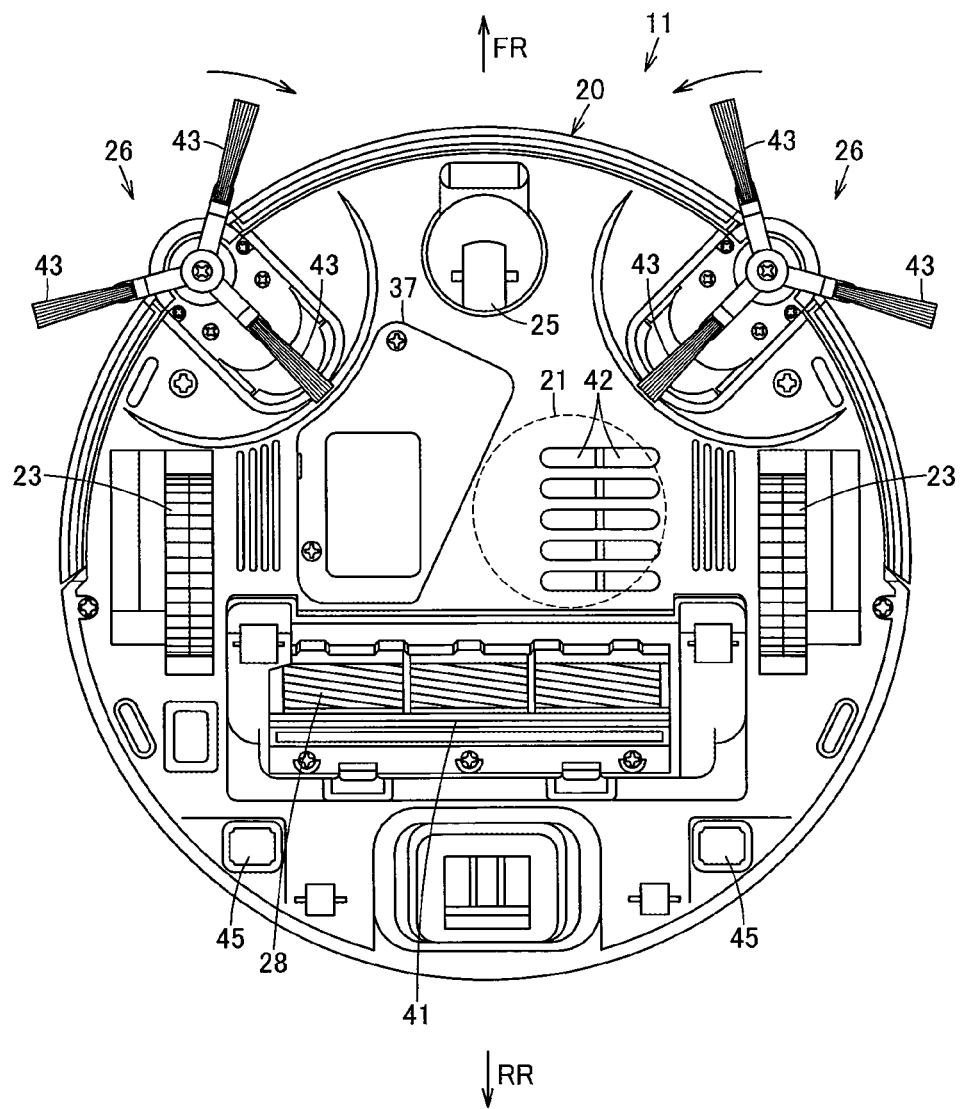
FIG. 4 is a plan view illustrating the autonomous traveling body of the first embodiment when viewed from the bottom side.

Thereafter, the imaging is performed at such a position with the camera 35 (Step S12), and the control unit 37 drives the turning wheels 23, 23 (motors 24, 24) to turn the main body case 20 by a given angle equal to or smaller than a horizontal angle of the view of the camera 35, preferably by a given angle equal to or smaller than half of the horizontal angle of the view of the camera 35, e.g., 30° to the left direction (or the right direction) in the first embodiment (Step S13, FIG. 1B). Next, the control unit 37 determines whether the main body case 20 has turned at the imaging position by a given imaging angle larger than an angle of view of the camera 35, e.g., 360° or larger (Step S14). When it is determined that the main body case 20 has not turned by the given imaging angle (360°) or larger (the main body case 20 has turned by an angle smaller than the given imaging angle (360°)), the processing returns to Step S12. In such control, the vacuum cleaner main body 11 can sequentially image still images in a plurality of adjacent directions at an angle equal to or smaller than the horizontal angle of view of the camera 35 for the given imaging angle (e.g., 360°). Therefore, these still images partially overlap each other. In the first embodiment, half or more than half of each still image overlaps with an adjacent still image, whereby the still images as a whole are imaged without any blind spots over the entirety of the given imaging angle.

Moreover, when it is determined at Step S14 that the main body case 20 has turned by the given imaging angle (360°) or larger, the control unit 37 compresses a plurality of still images output after being imaged with the camera 35 as a given file type to temporarily store them in a memory, and wirelessly transmits, from the wireless LAN device 36, each of these still images or a panorama image obtained by image processing such that overlapping parts of the adjacent still images become continuous (Step S15). The image data transmitted wirelessly is stored in the server 59 connected to the network 15 and can be checked remotely at arbitrary timing through the external device 16.

Next, the control unit 37 determines the mode immediately before having been changed to the imaging mode (Step S16). When it is determined at Step S16 that the mode is the charging mode or the stand-by mode, the control unit 37 returns the vacuum cleaner main body 11 to the charging device 12, similarly to the case of cleaning operation, and is changed to the charging mode together with the charging device control unit 58 (Step S17).

On the other hand, when it is determined at Step S16 that the mode is the cleaning mode (the cleaning mode has been interrupted and shifted to the imaging mode), the control unit 37 compares the capacity of the secondary battery 39 with a capacity required for the rest of the cleaning to determine whether the capacity of the secondary battery 39 is sufficient (Step S18). When it is determined that the capacity is sufficient, the control unit 37 drives the electric blower 21, the side brushes 26, 26 (side brush motor 27, 27), and the rotary brush 28 (brush motor 29) to return to cleaning (Step S19). When it is determined that the capacity is insufficient, the processing shifts to Step S17, so that the control unit 37 returns the vacuum cleaner main body 11 to the charging device 12, similarly to the case of cleaning operation, and is changed to the charging mode. Note that, when the imaging mode is finished, the mode may be controlled to always shift to the charging mode regardless of the mode immediately before having shifted to the imaging mode. In this case, after the charging of the secondary battery 39 is finished, the mode may be shifted to the stand-by mode. Alternatively, after the charging, the vacuum cleaner main body 11 may return to cleaning only when the mode immediately before having shifted to the imaging mode is the cleaning mode.

In this manner, according to the first embodiment described above, a position of the main body case 20 from which no obstacle is detected within a certain distance (in a virtual circle C of FIG. 1(a)) by the function of the obstacle detection unit that is the range finding unit of the sensor unit 31 is set as an imaging position, whereby it is possible to effectively image the room with the camera 35 without any hindrance of an obstacle and check the state of the room more easily.

Figure 6:
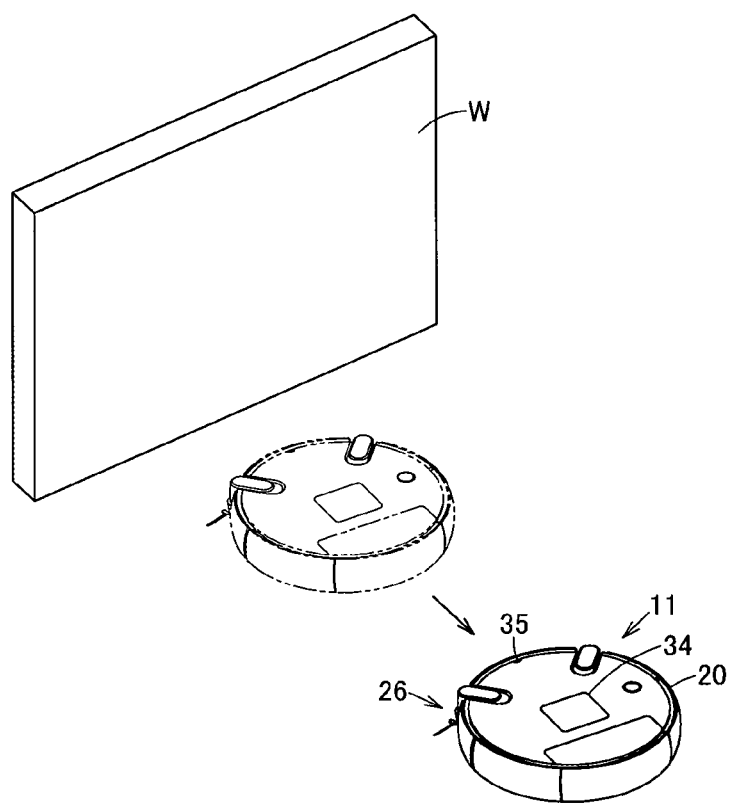
FIG. 6 is a perspective view schematically illustrating how an autonomous traveling body according to a second embodiment moves to an imaging position.
Figure 7:
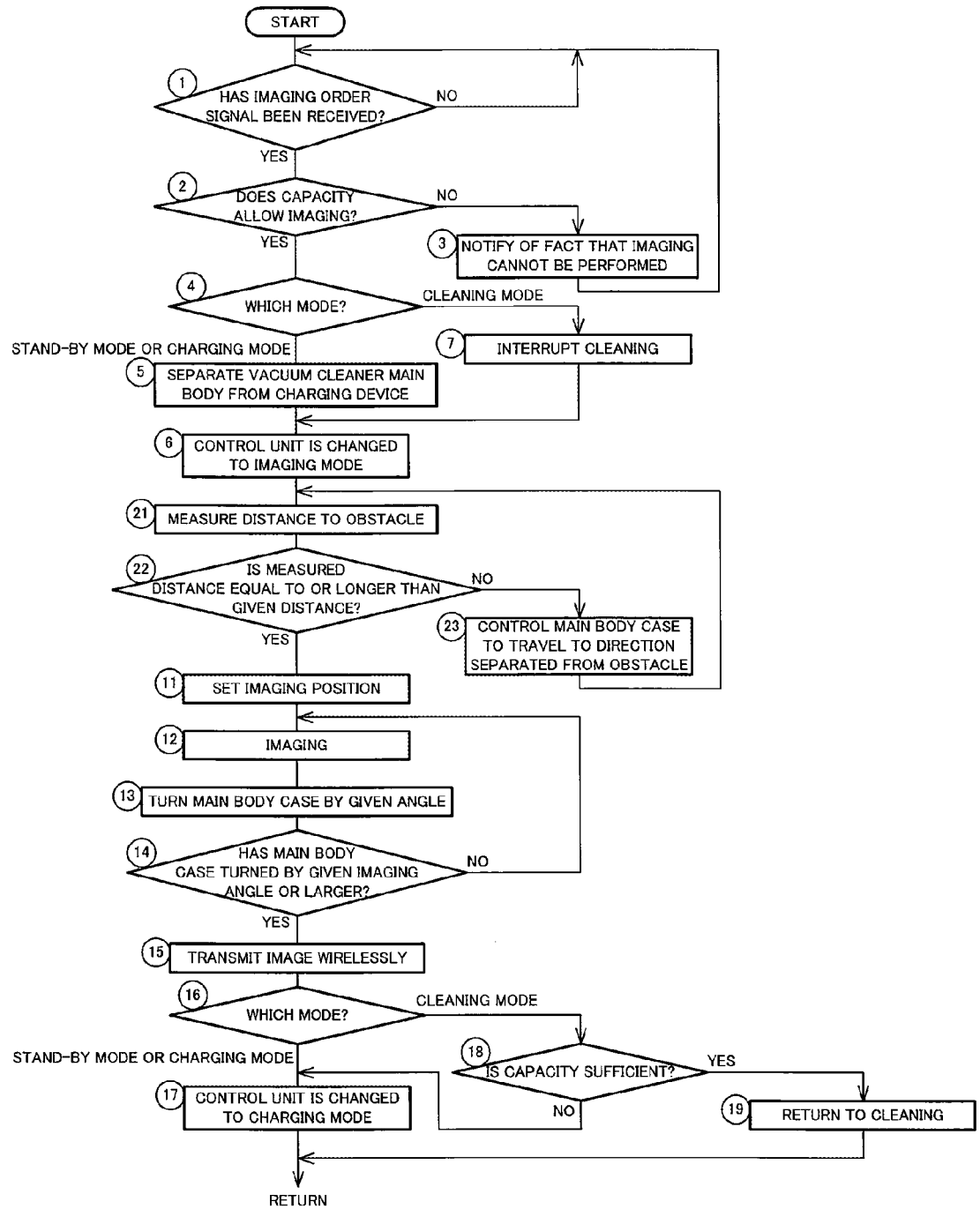
FIG. 7 is a flowchart illustrating control of the autonomous traveling body of the second embodiment in the imaging mode.

Subsequently, the second embodiment will be described with reference to FIG. 6 and FIG. 7. Note that the same components and action as the above-described first embodiment are represented with same symbols, and the description thereof will be omitted.

The second embodiment is different from the first embodiment in how the main body case 20 (vacuum cleaner main body 11) moves to an imaging position in the imaging mode, and the main body case 20 moves to a position at which the distance to an obstacle is equal to or longer than a given distance.

To be more specific, in the second embodiment, the control of the following Steps S21 to S23 is performed instead of the control of Steps S8 to S10 of the above-described first embodiment.

That is, the vacuum cleaner main body 11 measures, by the function of the obstacle detection unit (range finding unit) of the sensor unit 31, a distance between the main body case 20 and an obstacle on the side of the camera 35 of the main body case 20, that is, the wall W and the like on the front side of the camera 35 in the second embodiment (Step S21), and the control unit 37 determines whether the measured distance is equal to or longer than a given distance, e.g., 2 m or longer (Step S22). Then, when it is determined at Step S22 that the distance is not equal to or longer than the given distance (2 m) (the distance is shorter than the given distance (2 m)), the control unit 37 drives the driving wheels 23, 23 (motors 24, 24) to control the main body case 20 to travel to a direction separated from the obstacle for several seconds, for example (Step S23), and shifts the processing to Step S11. On the other hand, when it is determined at Step S22 that the distance is equal to or longer than the given distance (2 m), the processing shifts to Step S11 as it is.

That is, in the second embodiment, the control unit 37 determines not whether any obstacle exists around the vacuum cleaner main body 11 (main body case 20) but whether any obstacle exists within a given distance simply on the side to be imaged with the camera 35 of the vacuum cleaner main body 11 (main body case 20), and a position after moving by a given distance in the direction separated from an obstacle is set as an imaging position. As a result, it is possible, by easier control, to effectively image the room with the camera 35 for a shorter time without any hindrance of an obstacle, and check the state of the room more easily.

Figure 8A:
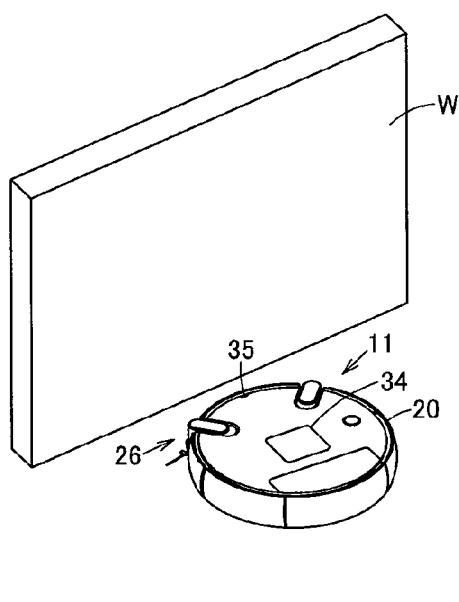
FIG. 8A and FIG. 8B are perspective views illustrating action in imaging of an autonomous traveling body according to a third embodiment.
Figure 8B:
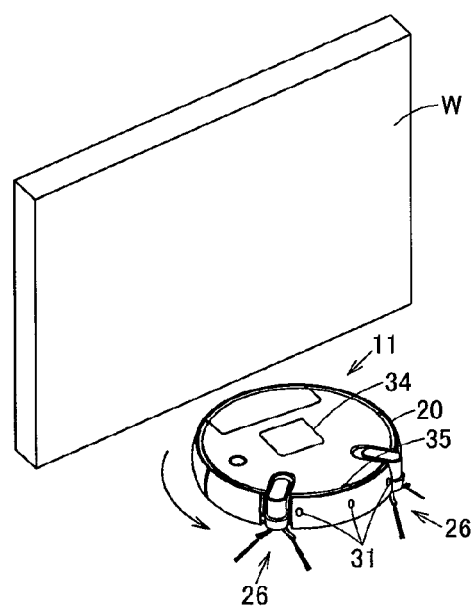
Figure 9:
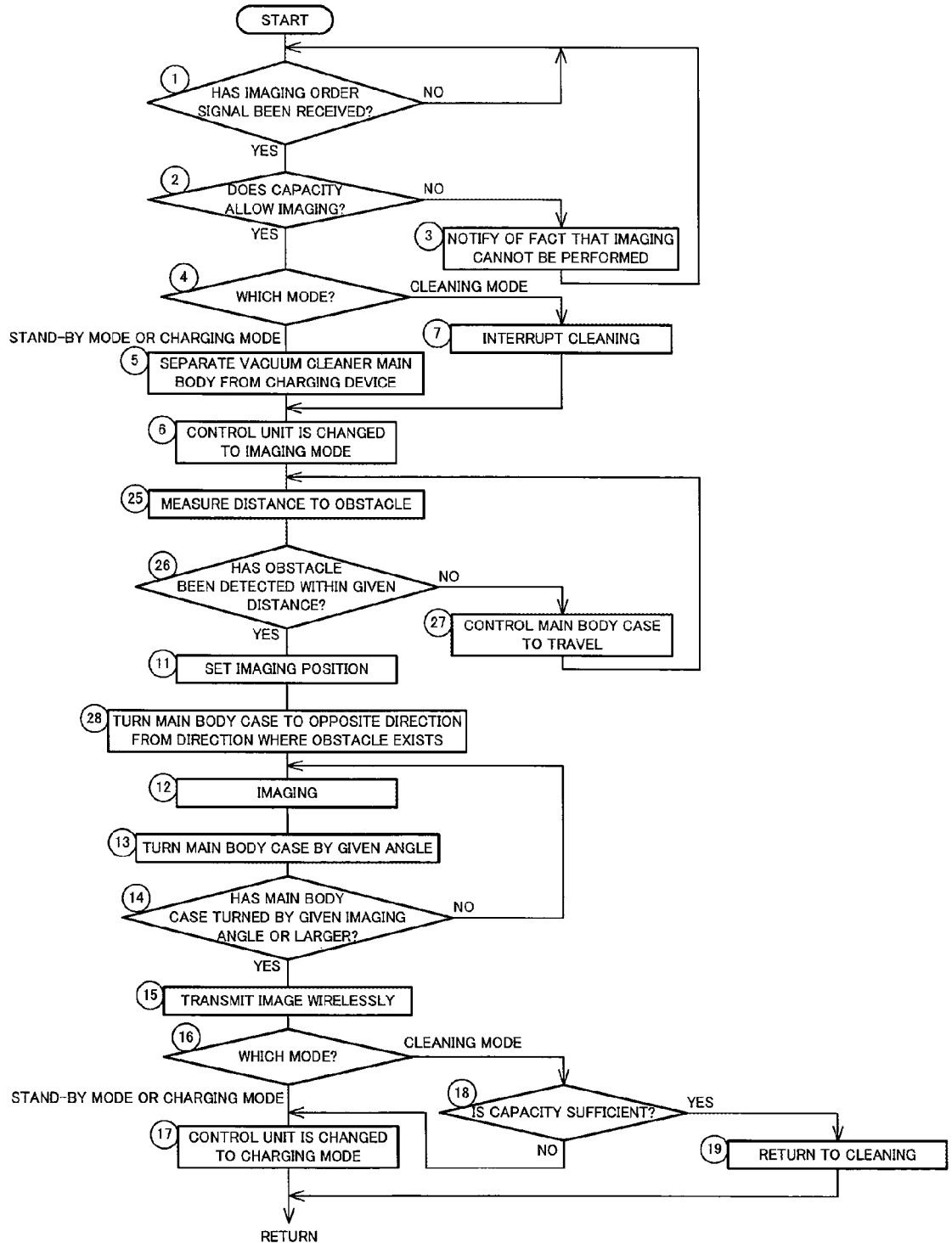
FIG. 9 is a flowchart illustrating control of the autonomous traveling body of the third embodiment in the imaging mode.

Next, the third embodiment will be described with reference to FIGS. 8A and 8B and FIG. 9. Note that the same components and action as the above-described embodiments are represented with same symbols, and the description thereof will be omitted.

Unlike the above-described embodiments in which an imaging position of the main body case 20 (vacuum cleaner main body 11) in the imaging mode is set to a position where the camera 35 is not hindered by an obstacle, the imaging direction itself of the camera 35 is changed in the third embodiment.

To be more specific, in the third embodiment, the control of the following Steps S25 to S28 is performed instead the control of Steps S8 to S10 of the above-described first embodiment.

That is, the vacuum cleaner main body 11 measures, by the function of the obstacle detection unit (range finding unit) of the sensor unit 31, a distance between the main body case 20 and an obstacle on the side of the camera 35 of the main body case 20, that is, the wall W and the like on the front side of the camera 35 in the third embodiment (Step S25), and the control unit 37 determines whether any obstacle exists within a given distance, e.g., 30 cm (Step S26). Then, when it is determined at Step S26 that no obstacle exists within the given distance (30 cm), the control unit 37 drives the driving wheels 23, 23 (motors 24, 24) to control the main body case 20 to travel a given distance, for example forward (Step S27), and shifts the processing to Step S25. Moreover, when it is determined at Step S26 that an obstacle exists within the given distance (30 cm) (FIG. 8A), the control unit 37 sets the position of the main body case 20 as an imaging position (Step S11), then drives the driving wheels 23, 23 (motors 24, 24) to turn the main body case 20 at the imaging position to the opposite direction from the direction where the obstacle exists by a given angle, e.g., 90° (Step S28, FIG. 8B), and shifts the processing to Step S12.

Note that although the given imaging angle is 360° at Step S14 in the above-described embodiments, it is already known in Step S26 in the third embodiment that an obstacle exists in the vicinity on the opposite side from the side to be imaged with the camera 35 of the main body case 20 (vacuum cleaner main body 11), and thus the given imaging angle is set to 180° in the third embodiment so as not to image the obstacle.

In this way, according to the third embodiment described above, a position at which the obstacle is detected by the function of the obstacle detection unit of the sensor unit 31 is set as an imaging position, and the side opposite to the side where the obstacle (wall W, etc.) exists is imaged with the camera 35, whereby it is possible to expect the effect of imaging the entire room from the wall edge of the room R. Therefore, the state of the room can be roughly grasped by one-time imaging sequencing.

Note that the function of the obstacle detection unit of the sensor unit 31 used at Step S21 and Step S25 in the above-described second and third embodiments may be achieved by not only the range finding unit such as an ultrasonic sensor but also a contact detection unit detecting an obstacle by contact, for example. In this case, the configuration can be further simplified, and the vacuum cleaner main body 11 can be produced at reduced costs.

Then, according to at least one of the above-described embodiments, the control unit 37 sets an imaging position of the camera 35 based on the detection of an obstacle by the function of the obstacle detection unit of the sensor unit 31. Therefore, it is possible to perform imaging at a position securely avoiding the obstacle, and image a wide range without any blind spots more securely.

Figure 10:
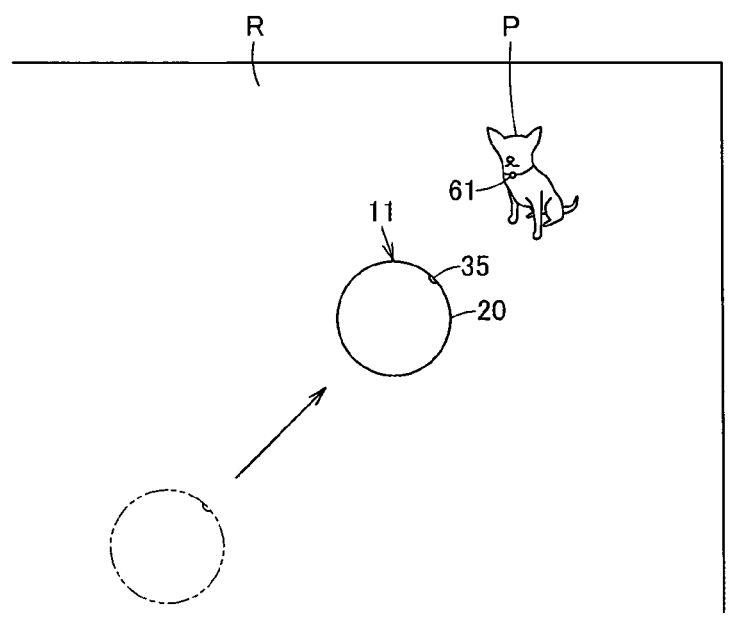
FIG. 10 is a plan view schematically illustrating how an autonomous traveling body according to a fourth embodiment moves to an imaging position.
Figure 11:
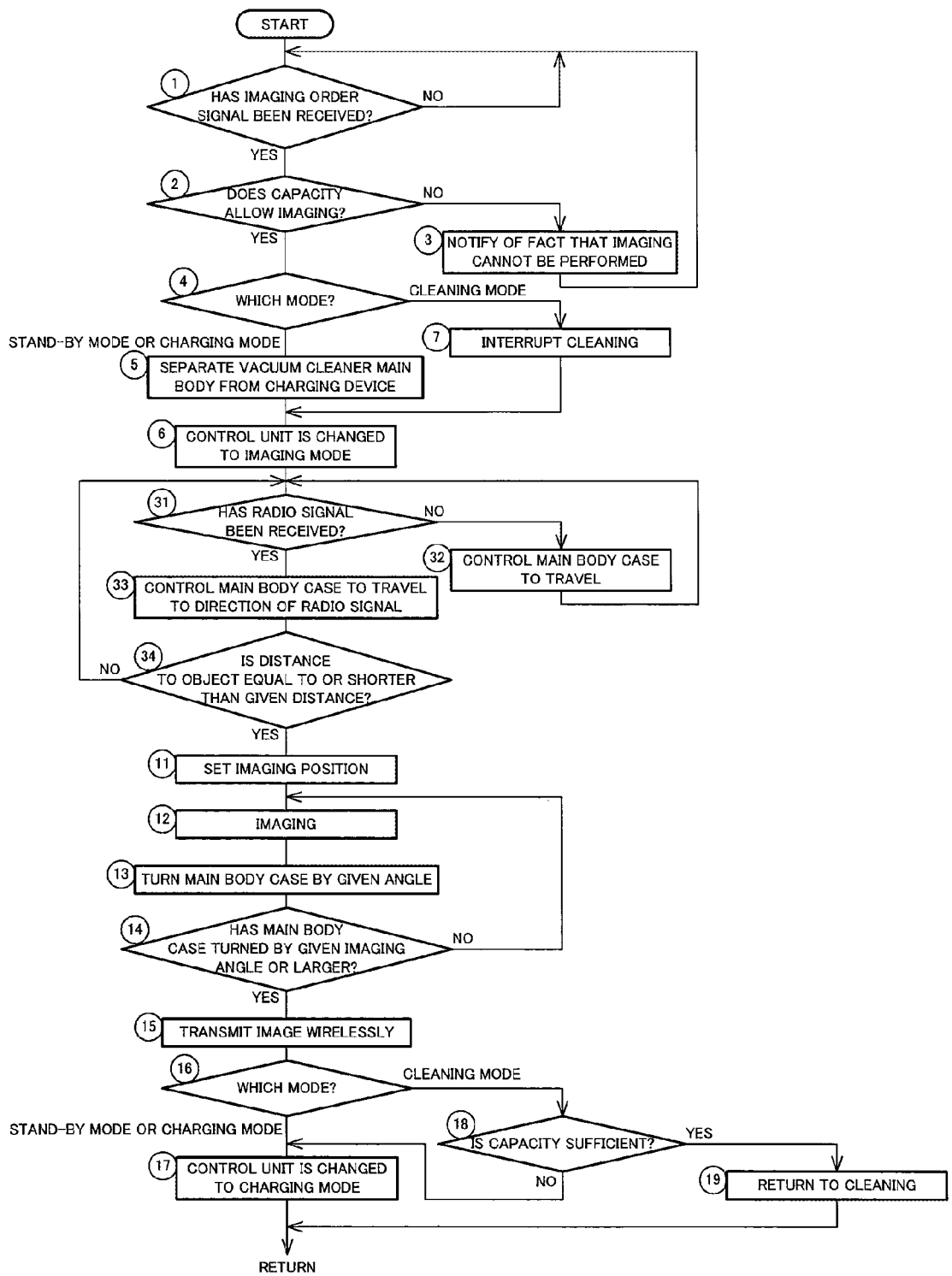
FIG. 11 is a flowchart illustrating control of the autonomous traveling body of the fourth embodiment in the imaging mode.

Next, the fourth embodiment will be described with reference to FIG. 10 and FIG. 11. Note that the same components and action as the above-described embodiments are represented with same symbols, and the description thereof will be omitted.

Unlike the above-described embodiments, when the wireless LAN device 36 has received radio signals (guide signals) in the imaging mode, an imaging position is set based on the positional relation between an object (subject P) having transmitted the radio signals and the main body case 20 in the fourth embodiment.

Here, the object (subject P) having transmitted the radio signals is, for example, a pet, a plant, or the like in the room R that is provided with a radio transmission unit 61 such as a beacon or a wireless IC tag outputting electromagnetic waves such as infrared and radio waves as positional information. When the wireless LAN device 36 has received radio signals (guide signals) transmitted from the radio transmission unit 61, the control unit 37 controls the main body case 20 (vacuum cleaner main body 11) to autonomously travel toward the direction from which the radio signals have been transmitted.

To be more specific, the control of the following Steps S31 to S34 is performed instead of the control of Steps S8 to S10 of the above-described first embodiment.

That is, the control unit 37 determines whether the radio signals have been received through the wireless LAN device 36 (Step S31). When it is determined that the radio signals have not been received, the control unit 37 drives the driving wheels 23, 23 (motors 24, 24) to control the main body case 20 to travel forward, for example, by a given distance (Step S32), and returns the processing to Step S31.

On the other hand, when it is determined at Step S31 that the radio signals have been received, the control unit 37 drives the driving wheels 23, 23 (motors 24, 24) to control the main body case 20 to travel to the direction of the radio signals by a given distance (Step S33), and determines, by the function of the object detection unit of the sensor unit 31, whether the distance to the object having transmitted the radio signals (radio transmission unit 61 of subject P) is equal to or shorter than a given distance, e.g., 1 m (Step S34).

Then, when it is determined at Step S34 that the distance to the object having transmitted the radio signals (radio transmission unit 61 of subject P) is not equal to or shorter than the given distance (1 m), the processing returns to Step S31. When it is determined at Step S34 that the distance to the object having transmitted the radio signals (radio transmission unit 61 of subject P) is equal to or shorter than the given distance (1 m), the processing shifts to Step S11.

Note that although the given imaging angle is 360° at Step S14 in the above-described first and second embodiments, the given imaging angle set to 180° in the fourth embodiment because it is basically sufficient if the object having transmitted radio signals (subject P) and the vicinity thereof can be imaged.

In this way, according to the above-described fourth embodiment, when the wireless LAN device 36 has received radio signals, the control unit 37 sets an imaging position based on the positional relation between the object having transmitted the radio signals and the main body case 20. Thus, the subject P can be imaged easily and securely only with the radio transmission unit 61 attached to the certain subject P to be imaged.

Particularly in the case where the subject P is a pet and the like, for example, when the radio transmission unit 61 is attached to the pet, the vacuum cleaner main body 11 detects the position of the pet even if the pet has moved, and moves to the vicinity of the position to securely image the pet.

Moreover, in the case where the subject P is a plant and the like, for example, when the radio transmission unit 61 is attached to the plant, the growing process of the plant can be monitored periodically.

Note that, when the object having transmitted the radio signals (radio transmission unit 61 of subject P) is imaged in the fourth embodiment, the object cannot be imaged appropriately with the presence of another obstacle between the object and the camera 35 in the imaging direction of the camera 35, and thus it is possible to move the main body case 20 to a position appropriately separated from the obstacle using the sensor unit 31 and image the object from such a position.

Moreover, instead of the configuration in which the radio transmission unit 61 transmits radio signals constantly, a radio reception unit may be provided, so that when the wireless LAN device 36 has transmitted radio signals as request signals, and the radio reception unit has received the radio signals, for example, the radio transmission unit 61 may transmit radio signals in response.

Furthermore, in the above-described embodiments, the camera 35 is turned by turning the main body case 20. However, the camera 35 may be attached so as to be turnable on the main body case 20 so that only the camera 35 is turned. In this case, the power consumption of the secondary battery 39 is suppressed as compared with the case in which the driving wheels 23, 23 (motors 24, 24) are driven to control the main body case 20 to travel, thus prolonging the service life of the secondary battery 39.

Moreover, when the turn of the main body case 20 and the imaging of the camera 35 are performed repeatedly, it is preferable that the main body case 20 is turned by a given angle equal to or smaller than a horizontal angle of view of the camera 35 and such a turn is stopped each time for imaging so as to improve the image quality of still images. However, when the main body case 20 is turned at a considerably lower speed than a shutter speed of the camera 35, the same action effect can be exerted even if the imaging is performed at every given angle while the main body case 20 is turned.

Furthermore, when the imaging is performed in the state that the camera 35 is directed to the outside in the radial direction relative to the central axis of the main body case 20, the camera 35 may be disposed on the rear side of the main body case 20. In this case, in the above-described third embodiment, for example, when the distance to the obstacle on the front side of the main body case 20, that is, on the opposite side from the side where the camera 35 exists is measured at Step S25 by the function of the obstacle detection unit (range finding unit) of the sensor unit 31, imaging is possible as it is with the camera 35 without a turn of the main body case 20 to the opposite direction from the direction where the obstacle exists at Step S28, which facilitates the control.

Then, according to at least one of the above-described embodiments, the control unit 37 controls the drive of the driving wheels 23, 23 (motors 24, 24) to allow the main body case 20 to turn. Thus, the configuration is not complicated with a number of components provided such as the camera 35 and the sensor unit 31, and the configuration can be achieved at low costs. In addition, in the vacuum cleaner main body 11, the main body case 20 is normally configured to be turnable so as to travel autonomously. Thus, this configuration can be used effectively as it is, and there is no need to separately add a configuration enabling the turn of the main body case 20 for only the imaging mode.

Figure 12:
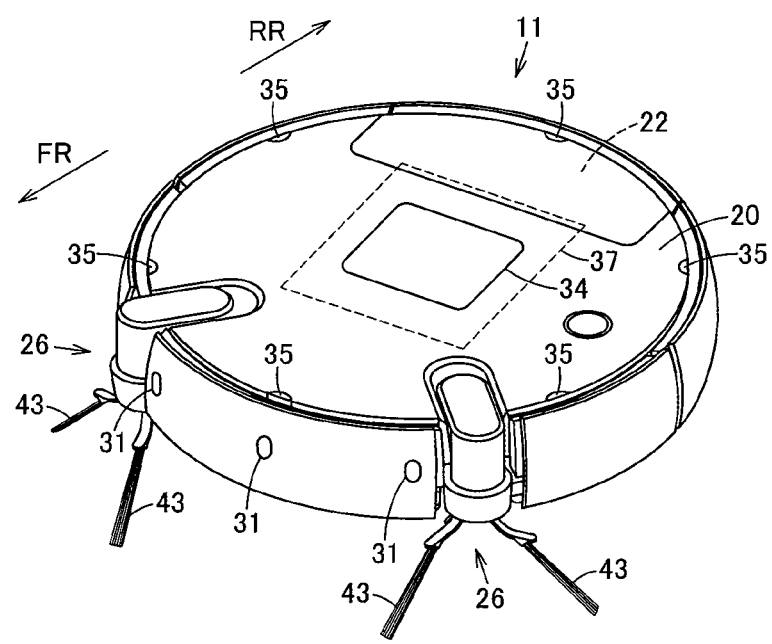
FIG. 12 is a perspective view illustrating an autonomous traveling body according to a fifth embodiment.

On the other hand, in the above-described embodiments, when a plurality of cameras 35 are provided on the main body case 20 in the circumferential direction with intervals of an angle equal to or smaller than the angle of view of the camera 35 and a plurality of sensor units 31 are provided, as in the fifth embodiment illustrated in FIG. 12, the turn in imaging with the camera 35 and in detection by the sensor unit 31 (for example, Step S8 of the first embodiment, Step S28 of the third embodiment, and Steps S12 to S14 of each embodiment) becomes unnecessary, thereby further simplifying the control.

Note that, in the above-described first to three and fifth embodiments, the vacuum cleaner main body 11 may be provided with infrared detection means (infrared detection unit) such as a human sensor, temperature detection means (temperature detection unit) capable of detecting an external temperature of the main body case 20 (vacuum cleaner main body 11), sound detection means (sound detection unit) capable of detecting an external sound volume and frequency of the main body case 20 (vacuum cleaner main body 11) such as a microphone, illuminance detection means (illuminance detection unit) capable of detecting external illuminance of the main body case 20 (vacuum cleaner main body 11), gas detection means (gas detection unit) capable of detecting toxic gas such as carbon monoxide outside the main body case 20 (vacuum cleaner main body 11), or odor detection means (odor detection unit) capable of detecting odor outside the main body case 20 (vacuum cleaner main body 11), for example, so that the control unit 37 is changed to the imaging mode based on the detection by such detection means (detection units). That is, the trigger for the shift to the imaging mode can be set arbitrarily.

When the infrared detection means (infrared detection unit) are used, it is possible to not only prevent a crime in a house by imaging with the camera 35 when an intruder attempting robbery and the like has been detected, for example, but to also monitor a pet or a child when a user is outside, or to notify the user of forgetting to turn off a fire origin such as a stove or occurrence of fire, for example, by imaging with the camera 35 when it has been detected.

Similarly, when the temperature detection means (temperature detection unit) are used, it is possible to prevent a crime in a house or notify a user of a fire, for example, by imaging with the camera 35 when a high-temperature equal to or higher than 32° C., for example, has been detected.

Furthermore, when the sound detection means (sound detection unit) are used, it is possible to not only prevent a crime in a house by imaging with the camera 35 when an abnormal sound such as the sound of glass breaking or an object falling, for example, or a large sound (e.g., 60 dB or larger) has been detected, but to also image the state of communication in a family after detecting it even when a user is in the room R, for example.

Moreover, when the illuminance detection means (illuminance detection unit) are used, it is possible to not only notify a user of abnormality such as fire by imaging with the camera 35 when a sudden change in illuminance (change of 100 lx or higher, for example) in the room R, for example, has been detected, but to also confirm, detecting lighting of the room R, that another family member has come back home.

Furthermore, when the gas detection means (gas detection unit) or the odor detection means (odor detection unit) are used, it is possible to notify a user of abnormality in a house by imaging with the camera 35 when carbon monoxide or its odor has been detected, for example.

Moreover, in the above-described embodiments, when the imaging order signals have been received while the secondary battery 39 is being charged, the operation may stand-by until the secondary battery 39 is charged to a given capacity (full charging, for example), and after the charging, the control unit 37 may be turned to the imaging mode.

Moreover, although the vacuum cleaner main body 11 has the function as an autonomous traveling body, the autonomous traveling body is not limited to one performing cleaning, and may be one simply performing imaging with the camera 35.

Furthermore, when the communication between the network 15 and the wireless LAN device 36 is interrupted such as the case in which the vacuum cleaner main body 11 has entered a blind spot of communication with the network 15 (access point 14) in the imaging mode, the vacuum cleaner main body 11 may be stopped at that position, or may be controlled to autonomously travel to a given position and then stop at the given position.

The wireless communication using the wireless LAN device 36 consumes electric power, and thus it is preferable to suppress communication by the wireless LAN device 36 while electric power of the secondary battery 39 is used, that is, during cleaning. Therefore, when the imaging order signals have been received in the cleaning mode, the imaging order signals may be ignored, notifying a user of the fact that cleaning is currently being performed using the wireless LAN device 36 through the network 15, while only in the charging mode or the stand-by mode in which the vacuum cleaner main body 11 is connected to the charging device 12, the shift to the imaging mode may be made possible.

Although the mode is shifted to the imaging mode when the imaging order signals have been received through the external device 16, the mode may be shifted automatically to the imaging mode using a timer at a preliminarily stored given time or each given time, for example. In this case, a given time or a given period of time may be set directly to the vacuum cleaner main body 11 (control unit 37) through external input means (external input unit) such as a remote controller (not illustrated) or the display unit 34 having the function of input operation means (input operation unit), for example, or may be set remotely from the external device 16. In this configuration, when a user wants an object to be imaged periodically, it is possible to automatically image the object.

Moreover, the controls of the above-described embodiments may be all included in one vacuum cleaner main body 11, and a user may select and set them for use.

Furthermore, when the mode is shifted to the imaging mode, and then the vacuum cleaner main body 11 runs into a step and the like during traveling and becomes stuck (unable to run), for example, the control unit 37 drives the driving wheels 23, 23 (motors 24, 24) to move the vacuum cleaner main body 11 backward or turn it to take it out of the stuck state. However, when the vacuum cleaner main body 11 still cannot exit the stuck state, a still image at a current position imaged with the camera 35 and transmitted externally, whereby a user can check the position of the vacuum cleaner main body 11 based on the still image, and can find the vacuum cleaner main body 11 easily and securely when the user outside returns home even if the vacuum cleaner main body 11 is in an inoperable state due to a lack of capacity of the secondary battery 39, for example.

Moreover, image data imaged with the camera 35 in the imaging mode may be stored in the memory without being transmitted externally, so that the user can check the image data when desired.

Furthermore, the camera 35 can be utilized not only in the imaging mode but also in the cleaning mode. For example, when the vacuum cleaner main body 11 cannot travel due to a step or an obstacle on a surface to be cleaned, it is possible to notify a user of a part that has not been cleaned successfully by imaging with the camera 35. The case in which it is determined that the main body case 20 (vacuum cleaner main body 11) cannot travel includes a case in which floating (running on) of the main body case 20 has been detected by the function of the step detection unit of the sensor unit 31 or a case in which the output from the obstacle detection unit (range finding unit) is not changed, for example. Moreover, the imaging with the camera 35 may be performed after the control unit 37 drives the driving wheels 23, 23 (motors 24, 24) to move the main body case 20 backward or turn it and the main body case 20 restarts traveling from the stuck state. Furthermore, when the vacuum cleaner main body 11 cannot enter a gap, it is possible to notify a user of the position that has not been cleaned successfully by imaging with the camera 35. This includes, for example, a case in which, with the function of contact detection means (contract detection unit) detecting contact with an obstacle and the like, which is provided to the sensor unit 31 of the main body case 20, contact has been detected by the function of the contact detection unit although no obstacle has been detected by the function of the obstacle detection unit of the sensor unit 31. In this way, the position that can be cleaned by the vacuum cleaner 11 is recognized by the user, thus improving his/her cleaning consciousness.

Moreover, the imaging order signals are ignored in the charging mode where the secondary battery 39 is charged. However, when electric power is supplied to the sensor unit 31 even in the charging mode so that the imaging order signals are accepted even in the charging mode, the state of the room R can be monitored constantly.

According to at least one of the above-described embodiments, the control unit 37 has the imaging mode in which the control unit 37 controls the main body case 20 to travel autonomously to given imaging positions so that still images in a plurality of adjacent directions are sequentially imaged with the camera 35 at an angle equal to or smaller than an angle of view of the camera 35. Thus, it is possible to securely image a wide range with the camera 35 without any blind spots. Therefore, the state or change of the room, for example, can be grasped effectively. Note that when the position at which imaging order signals have been received is a given imaging position, imaging is performed at such a position. That is, the autonomous traveling of the main body case 20 to a given imaging position in the imaging mode includes a case in which the autonomously traveling distance of the main body case 20 is 0.

Moreover, when an imaged still image is transmitted wirelessly, a user can easily check the still image using the external device 16. Therefore, it is possible to securely grasp the state in the house even when the user is outside.

Furthermore, when a panorama image is generated by performing image processing on imaged still images, the visibility is further improved.

In addition, the main body case 20 or the camera 35 is turned so that each still image is imaged at every certain angle (angle equal to or smaller than an angle of view), whereby imaging at a certain imaging height is possible without any blur, and the angles of adjacent still images become constant. Therefore, also when a panorama image is generated, easy processing is possible using various methods such as those in which one side of overlapped parts is simply removed and the overlapped parts are superimposed on each other.

Moreover, when the turning angle in imaging with the camera 35 is set to be equal to or smaller than half a horizontal angle of view of the camera 35, parts imaged overlapping the adjacent still images are increased. Thus, it is possible to suppress correction of distortion due to a lens of the camera 35 in the process for generating a panorama image, whereby the image processing becomes easier and the image quality of the generated panorama image can be further improved.

Furthermore, when imaging order signals for the camera 35 can be output from the external device 16, a user themselves can make an order for imaging, and can check the current state of the room R and the like in real time at desired timing.

When a non-contact type sensor such as an ultrasonic sensor is used as the function of the obstacle detection unit of the sensor unit 31, the vacuum cleaner main body 11 does not excessively collide with an obstacle, thus preventing the occurrence of collision sounds or damage to the main body case 20 or the obstacle, as compared with the case in which a contact type sensor or the like is used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An autonomous traveling body, comprising:
   a main body case;
   an imaging unit that is provided in the main body case and that can perform imaging at a given angle of view;
   a driving wheel that allows the main body case to travel;

a control unit that has at least a traveling mode in which drive of the driving wheel is controlled such that the main body case travels autonomously, including the main body case traveling autonomously to a given imaging position, and an imaging mode in which, while at the given imaging position, the imaging unit sequentially images still images in a plurality of adjacent directions at an angular interval equal to or smaller than the angle of view so that each of the still images has an overlapping part with an adjacent still image of the still images; and a communication unit that transmits the still images and/or a combined image generated from the still image to a remote memory storage that is accessible to a user.

2. The autonomous traveling body according to claim 1, further comprising an obstacle detection unit that is provided in the main body case and that detects an obstacle, wherein the control unit sets, in the imaging mode, the imaging position of the imaging unit based on detection of an obstacle by the obstacle detection unit.

3. The autonomous traveling body according to claim 2, wherein the obstacle detection unit is a range finding unit that detects the presence or absence of an obstacle by detecting a distance to the obstacle, and the control unit sets, in the imaging mode, a position of the main body case around which no obstacle is detected within a certain distance by the range finding unit as the imaging position.

4. The autonomous traveling body according to claim 2, wherein the control unit sets, in the imaging mode, a position after moving by a given distance in a direction separated from an obstacle when detecting the obstacle by the obstacle detection unit as the imaging position.

5. The autonomous traveling body according to claim 2, wherein the control unit sets, in the imaging mode, a position at which the obstacle is detected by the obstacle detection unit as the imaging position, so that an opposite side from a side where the obstacle exists is imaged by the imaging unit.

6. The autonomous traveling body according to claim 1, further comprising a wireless communication unit that can perform wireless communication, wherein when a radio signal has been received by the wireless communication unit, the control unit sets, in the imaging mode, the imaging position based on a positional relation between an object having transmitted the radio signal and the main body case.

7. The autonomous traveling body according to claim 1, wherein the control unit can turn the main body case by controlling drive of the driving wheel.

8. The autonomous traveling body according to claim 1, wherein, in the imaging mode, the control unit sets the imaging unit to perform the sequentially imaging, at the given imaging position, of the still images so that, for each still image, at least half of the still image is the overlapping part that overlaps with the adjacent image.

* * * * *